(12) United States Patent
Visser

(10) Patent No.: US 10,849,330 B2
(45) Date of Patent: Dec. 1, 2020

(54) SAUSAGE CASINGS

(71) Applicant: DEVRO (SCOTLAND) LIMITED, Chryston (GB)

(72) Inventor: Petrus Rimke Visser, Gendt (NL)

(73) Assignee: DEVRO (SCOTLAND) LIMITED, Chryston (GB)

( * ) Notice: Subject to any disclaimer, the term of this patent is extended or adjusted under 35 U.S.C. 154(b) by 0 days.

(21) Appl. No.: 15/117,311

(22) PCT Filed: Feb. 16, 2015

(86) PCT No.: PCT/EP2015/053235
§ 371 (c)(1),
(2) Date: Aug. 8, 2016

(87) PCT Pub. No.: WO2015/121475
PCT Pub. Date: Aug. 20, 2015

(65) Prior Publication Data
US 2016/0345597 A1    Dec. 1, 2016

(30) Foreign Application Priority Data
Feb. 14, 2014    (NL) ........................... 2012274

(51) Int. Cl.
*A22C 13/00*    (2006.01)

(52) U.S. Cl.
CPC .. *A22C 13/0016* (2013.01); *A22C 2013/0023* (2013.01)

(58) Field of Classification Search
CPC .................. A22C 13/0016; A22C 13/0013
USPC .................. 426/277, 105, 135, 420, 138
See application file for complete search history.

(56) References Cited

U.S. PATENT DOCUMENTS

| | | | |
|---|---|---|---|
| 3,533,817 A | 10/1970 | Shank | |
| 3,695,902 A | 10/1972 | Shank | |
| 4,615,889 A | 10/1986 | Fu Lu et al. | |
| 5,795,605 A * | 8/1998 | Morgan | A22C 13/0016 426/277 |
| 6,482,240 B1 | 11/2002 | Eckmayer et al. | |
| 2002/0042473 A1* | 4/2002 | Trollsas | A61L 24/043 525/54.1 |
| 2009/0162502 A1* | 6/2009 | Bueker | A22C 13/0013 426/140 |

FOREIGN PATENT DOCUMENTS

| CN | 1302552 A | 7/2001 |
|---|---|---|
| JP | 2003524375 A | 8/2003 |
| WO | WO 00/02463 A1 | 1/2000 |

OTHER PUBLICATIONS https://www.who.int/water_sanitation_health/dwq/chemicals/sodium.pdf Sodium in Drinking-water Originally published in 1996 (Year: 2003).*

(Continued)

*Primary Examiner* — Vera Stulii
(74) *Attorney, Agent, or Firm* — Eric D. Babych; Barnes & Thornburg LLP

(57) ABSTRACT

The invention is directed to a process for preparing a food casing, in particular a sausage casing. The sausages thus produced can be dried more efficiently because of the higher initial solids content of the casing, after they leave the extruder.

7 Claims, 1 Drawing Sheet

(56) References Cited

OTHER PUBLICATIONS

European Patent Office Examination Report for EP App. No. 15704324.1, dated Dec. 14, 2017, 6 pages.
International Search Report and Written Opinion for related International Application No. PCT/EP2015/053235, dated Apr. 20, 2015 (12 pages).
First Office Action with English translation for related Chinese Application No. 201580006922.6, 14 pages (dated Feb. 26, 2018).
English Translation of Japanese Office Action for related application, dated Jan. 22, 2019, 6 pages. [Note: Cited Documents U.S. Pat. No. 3,695,902 and U.S. Pat. No. 3,533,817 have been previously cited in an IDS filed on Aug. 8, 2016. Cited Document JPS623733A (equivalent to U.S. Pat. No. 4,615,889)—equivalent U.S. Pat. No. 4,615,889 has been previously cited in an IDS filed on Aug. 6, 2016. Cited Document JP2003524375A (and equivalent WO 00/02463 A1) are cited above.
Australian Examination Report No. 1 for related application, dated Sep. 28, 2018, 3 pages. [Note: the two references cited in this Exam Report were previously cited in an IDS filed on Aug. 8, 2016.].
Chinese Second Office Action for related application, dated Oct. 22, 2018, pages. [Note: the three references cited in this Office Action were previously cited in an IDS filed on Aug. 8, 2016.].

* cited by examiner

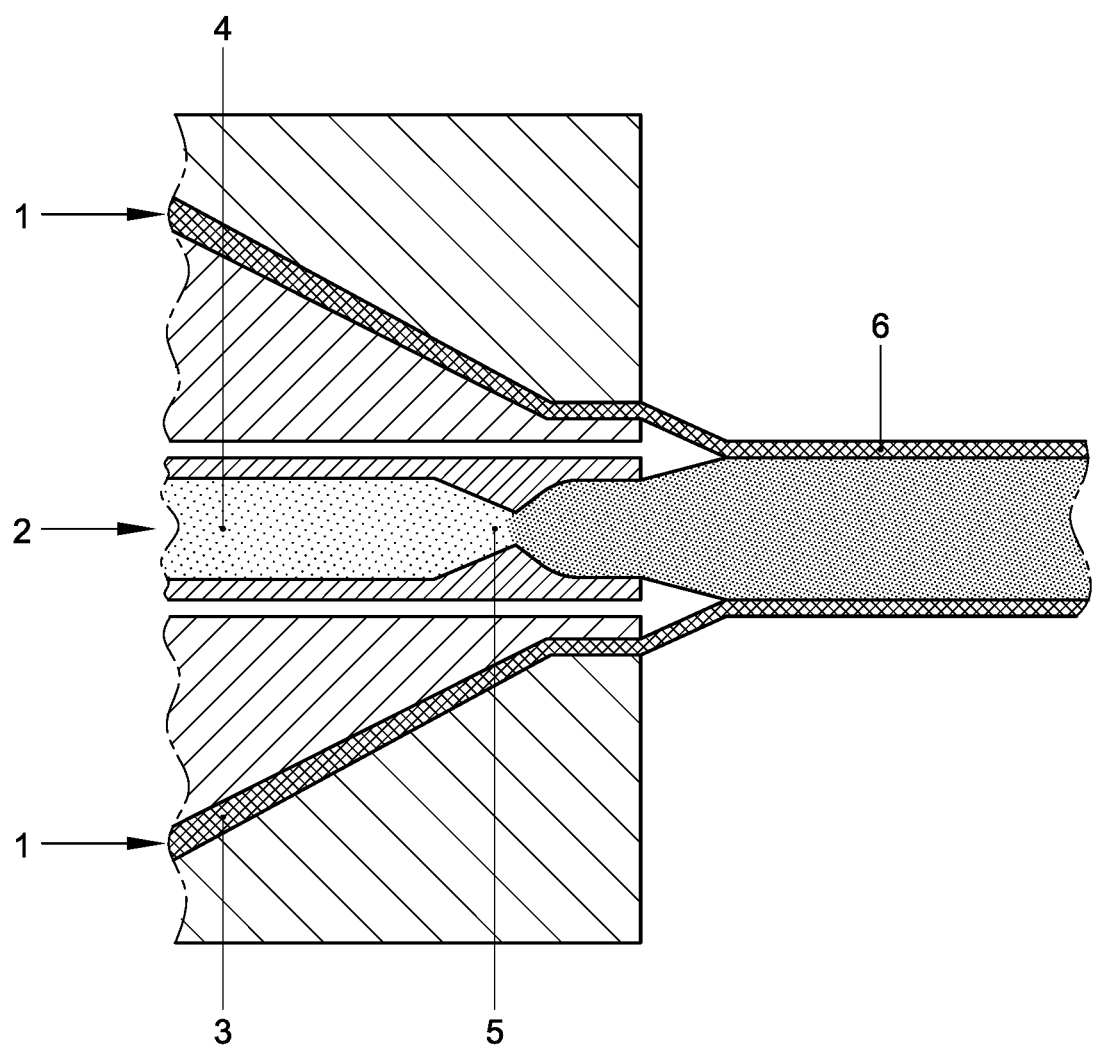

SAUSAGE CASINGS

The invention is in the field of food products. In particular, the invention pertains to casings for food, such as sausage casings, especially sausage casings for cooked-smoked sausages, such as Frankfurters and traditional Dutch ring sausage ("rookworst"), and the like.

Collagen is widely used for making artificial sausage casings. Collagen casings are typically produced from the collagen of bovine or porcine origin (typically from hides, intestines, bones and/or tendons). Collagen of poultry or fish origin may also be used.

To obtain collagen casings, a collagen gel is prepared, by mixing animal hide or skin derived milled collagen fibers with water and acidifying the mixture to a pH of typically around 3, which results in swelling of the collagen fibers, thus producing the collagen gel. The resulting gel may be extruded through a die to the desired diameter to produce the casings. In a newer process, a collagen gel is coextruded with the meat blend. Typically the concentration of collagen protein in the gel is around 4 wt. %. After the casings are applied to the sausages they are passed through a salt solution (typically sodium chloride) to set the coating. subsequently, the sausages are dried, normally using hot hair.

The drying process of the sausages requires a considerable amount of energy. In fact, the majority of the energy requirement of the sausage production process is taken up by the drying process. Also because of the intensity of the drying process, the resulting sausages are often burnt by the supporting gridiron of the oven, which results in sausages being marked, which is perceived as less attractive and therefore generally not acceptable for consumers.

It would be highly desirable to modify the sausage making process so that the sausages can be dried more readily, requiring less energy consumption.

Moreover, the drying step is typically the rate determining step in the production process of sausages. Hence, by reducing the required drying time, the production capacity of existing lines is increased without the need to invest in additional equipment or machinery. For instance, when the drying time is reduced by 20%, production capacity may be increased with 20% on the same production line.

The present inventors have searched for alterations in the formula of the sausage casing to enable more efficient drying. One approach is to increase the collagen concentration of the gel. A more concentrated gel implies that less water needs to be evaporated therefrom. However, increasing the concentration of collagen in the gel brings about an increase in the gel's viscosity as well, which can easily result in a gel that is to viscous to be processed properly, in particular in the extrusion step. For instance, increasing the collagen content of a gel from 4 wt. % to 8 wt. % resulted in one experiment in an increase of the viscosity from 12,000 cP (all viscosities as mentioned herein have been measured using a Brookfield Viscometer with a customized spindle at 30 rpm and 5° C.) to more than 20,000 cP, which was too high to be extruded properly on the existing extruders.

It was found that by adding salt (in particular sodium chloride) to the collagen/water mixture, prior to the addition of acid, the swelling of collagen was limited. The resulting gel was found to have excellent rheological properties, enabling it to be processed in an extrusion step.

Surprisingly it was found that the moment of adding the salt is critical. If the salt is added after the acidification, a non-swollen fiber structure is obtained that cannot be extruded.

BRIEF DESCRIPTION OF THE DRAWING FIGURES

FIG. 1 schematically depicts a co-extrusion process for making a sausage.

DETAILED DESCRIPTION

Thus, in a first aspect the present invention relates to a process for preparing a food casing, comprising the steps of preparing a collagen water mixture, which further contains salt, followed by a subsequent acidification step, thus forming a gel, followed by a step wherein said casing is formed. The sausages produced in accordance with the invention can be dried more efficiently because of the higher initial solids content of the casing, after they leave the extruder.

The acidification step can be carried out using for instance lactic acid, acetic acid or combinations thereof.

Preferably the salt, which is preferably an alkali halide, more preferably sodium chloride, is present in the collagen/water mixture in an amount of about 0.05-1 mol/dm$^3$, more preferably about 0.1-0.7 mol/dm$^3$, even more preferably about 0.15-0.35 mol/dm$^3$, for instance 0.22 mol/dm$^3$. These amounts were found to give good results with respect to swelling behavior.

The salt according to the present invention may reduce the swelling of collagen fibers upon acidification and as such the higher protein concentration does not increase the viscosity of the resulting collagen gel. Polysaccharide salts, such as pectinate and/or alginate salts (e.g. sodium alginate and/or sodium pectinate) typically increase the viscosity of the resulting gel and are therefore not preferred. Hence, the salt according to the present invention is preferably a salt other than an alginate salt and/or pectin salt (pectinates), more preferably a salt other than a salt of a polysaccharide.

The amount of collagen present in the collagen/water mixture is preferably more than 4 wt. %, more preferably more than 5 wt. %, even more preferably 6-10 wt. %. a collagen concentration of about 8 wt. % was found to be very suitable.

The resulting gel generally has a viscosity of less than 20 000, typically about 12 000-19 000 cP, preferably about 12 000-16 000 cP, which can be extruded very well in existing extruders.

In accordance with the present invention sausages are prepared by applying the casings obtained from the gel described above in the usual manner, for instance using the coextrusion process described in Meatprocessing, February (1982)30-36.

Another advantage of the gel according to the present invention, is that a higher collagen concentration in the gel allows for a lower amount of gel to be used in the co-extrusion of the sausages. This may lower the total cost of the production of sausages.

In a typical co-extrusion process for making sausages is shown schematically in FIG. 1. The collagen gel (also sometimes referred to as collagen dough is fed in a cone-shaped nozzle of an extruder, as indicated by arrow 1. The meat batter (4) is fed through the center of the nozzle, as indicated by arrow 2. It passes a venturi (5). Then the collagen stream (3) is directed to the outside of the sausage and forms the socalled sausage rope 6. After leaving the extruder the sausage thus formed is typically passed through a saturated salt solution (typically sodium chloride), typically for about 2 seconds. It is then cut to the required length and deposited on a stainless steel supporting belt and exposed to hot air. Typically the hot air has a temperature of about 100° C.

Wet collagen is irreversibly converted to gelatin at relatively low temperatures, for instance already at 40° C. or above. In the prior art, at the position where the sausage surface contacts the supporting grid gelatinization may occur resulting in marks and/or indentations in the sausage surface. Due to the higher initial solids content of the skin produced in accordance with the present invention the drying temperature can be decreased without loosing production capacity and indentations will be less perceivable. After drying the food products, in particular sausages, obtainable by the process of the invention are characterized by the absence or substantial absence of any burn marks and/or indentations that would result from heating too long on a gridiron in the drying oven.

EXAMPLES

Example 1 (Reference)

A collagen gel was prepared by mixing bovine collagen fibers (4 wt. %) with water, acidifying the mixture to a pH of 3 with lactic acid and homogenizing. The acidification resulted in swelling of the collagen fibers, thus producing the collagen gel. The gel was used to prepare collagen coated sausages by coextrusion. The resulting sausages were dried in a conventional oven with hot air of 100° C. The sausages were heated to a temperature of 60° C. for a period of 12 minutes. This resulted in part of the sausages showing burnmarks on the outer surface in the form of dark stripes, which corresponded to the gridiron.

Example 2 (Reference)

Example 1 was repeated, but the amount of collagen in the mixture was increased to 8 wt. %. The resulting gel after acidification was too viscous to be processed by the extruder. No sausage could be made.

Example 3

Example 2 was repeated but now NaCl was added to the mixture, prior to the acidification step. The ingredients were thoroughly mixed. The amount of NaCl used was 0.22 mol/liter. After acidification the resulting gel was clearly less viscous than in Example 2 and could be properly extruded. The resulting cases were used to prepare sausages as described in Example 1. The sausages were subsequently dried to the same surface dryness water content. The required drying time was reduced by 25%. In an alternative test the sausages were dried at 80° C. in the same time as in Example 1 (12 minutes). The sausages had the same surface dryness in spite of the shorter time. The resulting dried sausages did not show any marks after the drying step.

Example 4

Example 3 was repeated but now 7 wt. % bovine collagen fibers and 1.20 wt. % NaCl were mixed with water. The resulting collagen gel had a viscosity of 19.000 cP.

The resulting cases were used to prepare sausages as described in Example 1. The rheological properties of the collagen gel were similar to the collagen gel obtained in Example 1. Thus a well distributed coverage of the collagen gel on the sausage and a non-pulsating string of sausages extruded by the coextruder were obtained. The amount of collagen gel on the sausages was reduced to 70% and the required drying time was reduced to 80% compared to Example 1.

The invention claimed is:

1. A co-extrusion process for preparing a food casing, comprising:
   preparing a collagen water mixture by adding a salt to the collagen water mixture, wherein the concentration of collagen in said mixture is 6-10 wt. %, wherein said salt is sodium chloride and is present in said mixture in a concentration of about 0.1 to about 0.7 mol/dm$^3$
   followed by a subsequent acidification step, thereby forming a gel,
   followed by a co-extrusion step wherein said casing is formed from said gel, via a co-extrusion process, wherein said salt reduces swelling of collagen fibers upon said acidification;
   and
   wherein said gel has a viscosity of less than 20,000 cP.

2. The process of claim 1, wherein said salt is present in said mixture in a concentration of about 0.15 to about 0.35 mol/dm$^3$.

3. The process of claim 1, wherein said salt is present in said mixture in a concentration of about 0.22 mol/dm$^3$.

4. The process of claim 1, wherein a concentration of the collagen in said mixture is about 8 weight %.

5. The process of claim 1, wherein said gel has a viscosity in a range of about 12,000 to about 19,000 cP.

6. The process of claim 1, wherein said gel has a viscosity in a range of about 12,000 to about 16,000 cP.

7. The process of claim 1, wherein the food casing is a sausage casing.

* * * * *